United States Patent
Gueter

(10) Patent No.: US 7,367,922 B2
(45) Date of Patent: May 6, 2008

(54) DEVICE FOR CONTROLLING AN AUTOMATIC GEARBOX

(75) Inventor: Christian Gueter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/806,238

(22) Filed: May 30, 2007

(65) Prior Publication Data

US 2007/0232441 A1    Oct. 4, 2007

Related U.S. Application Data

(63) Continuation of application No. PCT/EP2005/011742, filed on Nov. 3, 2005.

(30) Foreign Application Priority Data

Nov. 30, 2004    (DE) .................. 10 2004 057 724

(51) Int. Cl.
    *B60W 10/10*    (2006.01)
(52) U.S. Cl. .................. 477/115; 477/905; 74/335; 701/52
(58) Field of Classification Search ................ 477/115, 477/904, 905; 74/335; 701/52
    See application file for complete search history.

(56) References Cited

U.S. PATENT DOCUMENTS

| | | | |
|---|---|---|---|
| 5,050,456 A * | 9/1991 | Fukuda ........................ 477/115 |
| 6,035,735 A | 3/2000 | Graf et al. |
| 6,622,581 B2 | 9/2003 | Seidel et al. |
| 6,821,228 B2 * | 11/2004 | Aoki et al. ................... 477/44 |
| 7,029,421 B2 | 4/2006 | Henneken et al. |

2006/0276950 A1    12/2006    Wild et al.

FOREIGN PATENT DOCUMENTS

| | | | |
|---|---|---|---|
| DE | 32 01 440 A1 | | 9/1983 |
| DE | 197 36 406 A1 | | 3/1999 |
| DE | 100 52 880 A1 | | 5/2002 |
| DE | 101 25 698 A1 | | 11/2002 |
| JP | 05095725 A | * | 4/1993 |
| JP | 2001099309 A | * | 4/2001 |
| WO | WO 2004/081417 A2 | | 9/2004 |
| WO | WO 2005/121605 A1 | | 12/2005 |

OTHER PUBLICATIONS

International Search Report dated Jan. 23, 2006 (Two (2) pages).
German Office Action dated Sep. 8, 2005 including English translation (Six (6) pages).

* cited by examiner

*Primary Examiner*—Ha D. Ho
(74) *Attorney, Agent, or Firm*—Crowell & Moring LLP

(57) ABSTRACT

A device for controlling an automatically shifting transmission of a motor vehicle is provided. A first selection device which sets gear speeds adjustable in an automatic mode, a second selection device which manually sets the gears of the transmission in a manual mode provide inputs to an electronic control device. When the second selection device is actuated, the control device commands a gear change in manual mode directly from the automatic mode. After actuation of the second selection device, a verification process is started to check whether a positive longitudinal acceleration process has begun within a predetermined time window. If no positive acceleration process has occurred within the time window, a switch is made back to automatic mode. If a positive acceleration process has occurred, returning to automatic mode is based on factors such as the end of the acceleration mode and repeated acceleration operations in a short time.

7 Claims, 1 Drawing Sheet

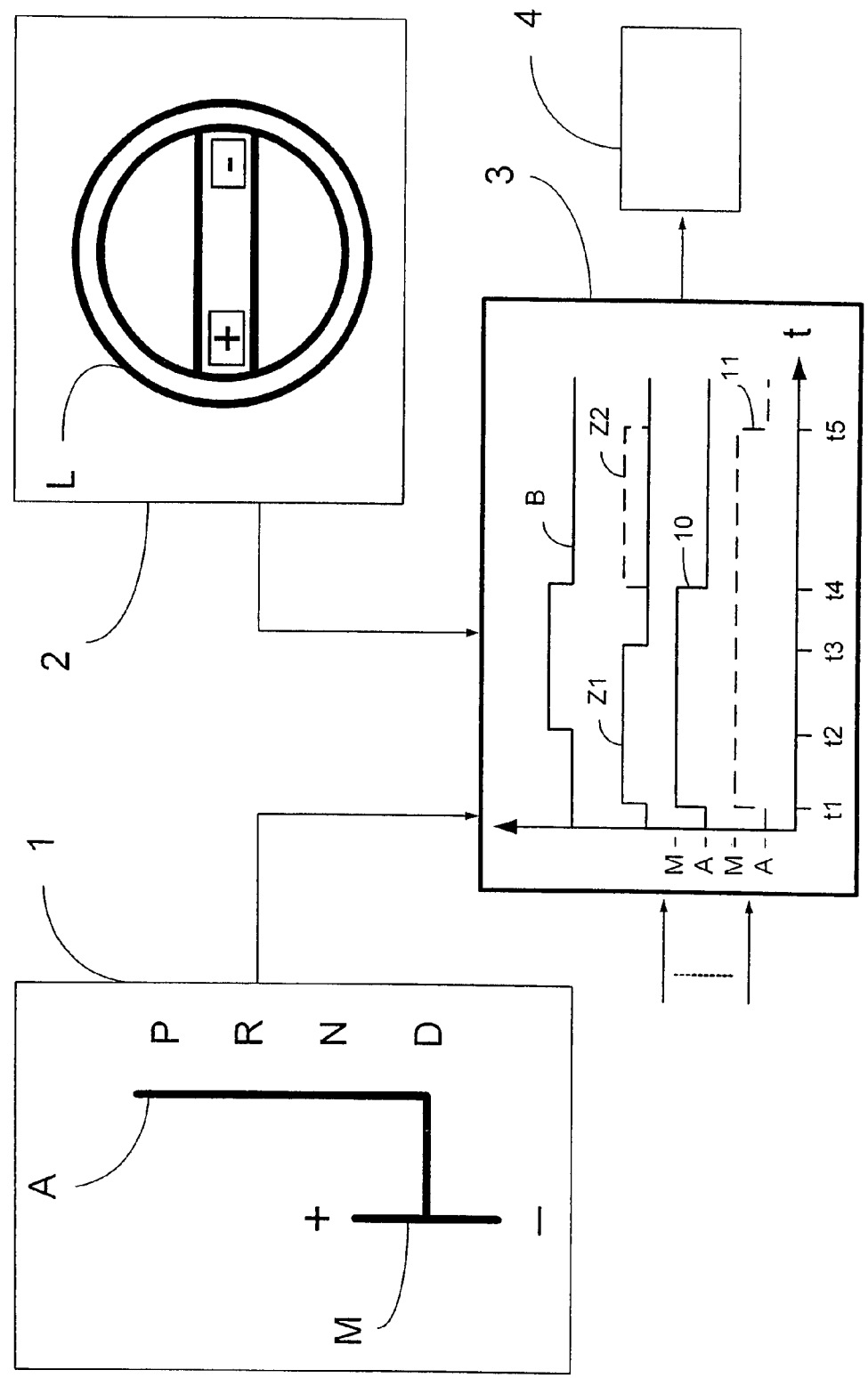

DEVICE FOR CONTROLLING AN AUTOMATIC GEARBOX

This application is a Continuation of PCT/EP2005/0011742, filed Nov. 3, 2005, and claims the priority of DE 10 2004 057 724.2, filed Nov. 30, 2004, the disclosures of which are expressly incorporated by reference herein.

BACKGROUND AND SUMMARY OF THE INVENTION

The invention relates to a device for controlling an automatically shifting transmission.

Such a device is known from German patent publication DE 197 36 406 A1, for example. This known device has a first selection device in the form of a selecting lever by which the gear speeds P, R, N, D, which are adjustable in an automatic mode, may be set. By use of a second selection device in the form of a steering wheel having two switches, in a manual mode the gears of the transmission can be manually shifted up or down in stages. The known device has an electronic transmission control device which is common in automatic transmissions or automatic manual transmissions. The basic concept of the device known from German patent publication DE 197 36 406 A1 is that the manual mode is activated from automatic mode when the second selection device is actuated. This manual mode is maintained until situations are recognized in which the automatic mode is desirable, for example until a significant acceleration is detected. It is assumed that during an acceleration in automatic mode it is a priority to relieve the driver.

The object of the present invention is to improve a device for controlling an automatically shifting transmission with regard to desired driving dynamics which are to be more strongly influenced by the driver.

By use of the device according to the invention, when a positive longitudinal acceleration is detected, a higher priority is assigned to a manual intervention of the driver, in particular by appropriate programming of the electronic control device, than to the measures that would be performed according to an automatic mode. The invention has particular relevance for spontaneous downshifting for passing maneuvers.

The invention is explained in greater detail with reference to one exemplary embodiment.

Other objects, advantages and novel features of the present invention will become apparent from the following detailed of the invention when considered in conjunction with the accompanying drawings.

BRIEF DESCRIPTION OF THE DRAWINGS

FIG. 1 is a schematic illustration, providing an overview of an overall system the present invention.

DETAILED DESCRIPTION

FIG. 1 shows a device for controlling an automatic transmission 4 of a motor vehicle, comprising a first selection device 1 which includes a selecting lever (not illustrated) which may be moved in at least one gear (first gear) for setting the gear speeds P, R, N, and D, which are adjustable in an automatic mode A. Also illustrated is a second selection device 2 in the form of an upshift switch (+switch) and a downshift switch (−switch) by which the gears of the transmission can be manually shifted up or down in stages in a manual mode M when, starting from automatic mode A, before the second selection device 2 is actuated, another control element, in this case the selection device 1, has been actuated for switching to manual mode M. In the example illustrated, for switching to manual mode M the selection device 1 must be moved at least into the second gear, in which the gears of the transmission may likewise be manually shifted up or down by use of an upshift or downshift switch.

An electronic control device 3 is also present which receives various input signals, including the signals from the selection devices 1 and 2. Depending on these input signals, by use of a programmed switching logic system the control elements for the automatic transmission 4 are actuated for shifting and engaging in predetermined gears.

When the second selection device 2 is actuated without prior actuation of the other control element 1 which is provided for consistently switching to manual mode M, first a switch is made to manual mode M and a direct, upshift or downshift operation is permitted. In other words, when, starting from automatic mode A, the upshift switch "+" is actuated at a time t1, a direct shift to the next higher gear is performed, and when, starting from automatic mode A, the downshift switch "−" is actuated at a time t1, a direct shift to the next lower gear is performed.

A first time window Z1 is then started in the control device 3 at time t1 after the switch to manual mode M. In a verification process the control device 3 checks whether a positive longitudinal acceleration process B at least begins within this first time window Z1, i.e., whether a positive longitudinal acceleration process B is already present or is beginning. In the example illustrated, a positive longitudinal acceleration process B begins at time t2. The first time window Z1 ends at time t3, but the positive longitudinal acceleration process B does not stop until time t4. In a first alternative according to the invention, at time t4 a switch is made from manual mode M back to automatic mode A according to the curve 10. If a positive longitudinal acceleration process B had not occurred within the predetermined first time window Z1, the control device 3 would have switched back to automatic mode A at time t3. When the second selection device 2, for example the downshift switch "−", is reactuated, a further gear shift is performed in manual mode M within the first time window Z1 or during the positive longitudinal acceleration process B, and the verification process and thus the first time window Z1 is restarted.

In a second alternative according to the invention, after the end of a positive longitudinal acceleration process B (in this case, at time t4) a second time window Z2 is started according to the curve 11, in which the system waits for an additional positive longitudinal acceleration process B to begin. The second time window Z2 may have the same length as the first time window Z1. If no further positive longitudinal acceleration process B occurs within the second time window Z2, at the end of the second time window Z2 a switch is made back to automatic mode A at time t5. If a new positive longitudinal acceleration process B had started within the second time window Z2, a third time window would be started after this further positive longitudinal acceleration process B ended. These repeated verification processes based on time windows ensure that a brief release of the accelerator pedal or a brief interruption in a positive longitudinal acceleration process B does not result in uncomfortable back-and-forth shifting. Thus, a switch from manual mode M is made back to automatic mode A at the latest when no positive longitudinal acceleration process (B) has begun within a time window Z2 following the first time window Z1, and so forth, i.e., within a time window beginning as a result of the end of a positive longitudinal acceleration process B.

When the second selection device 2, for example the downshift switch "−", is reactuated within the second or subsequent time window or during a further positive longitudinal acceleration process B, a further gear shift is performed in manual mode M, and the entire verification process and thus the first time window Z1 is restarted.

By use of this device according to the invention, consideration may be made on the one hand for the power desired by the driver, and on the other hand for the requirements for optimal comfort with regard to ease of operation.

What is claimed is:

1. A device for controlling an automatically shifting transmission of a motor vehicle, comprising:
   a first selection device, said first selection device permitting setting of at least gear speeds which are adjustable in an automatic mode;
   a second selection device, said second selection device permitting manual shifting up or shifting down the gears of the transmission in stages in a manual mode; and
   an electronic control device, said control device controls actuators for the transmission as a function of signals from at least one of the first and second selection devices and from additional input signals,
   wherein
      when the second selection device is actuated, the control device controls the transmission actuators to perform a requested gear change in the manual mode directly from the automatic mode,
      after an actuation of the second selection device which has resulted in a direct gear shift in the manual mode starting from the automatic mode, the control device performs a verification process to determine whether a positive longitudinal acceleration process is present or has begun within a predetermined first time window, and
      a switch is made from the manual mode back to the automatic mode if the positive longitudinal acceleration process has not occurred or begun within the first predetermined time window.

2. The device according to claim 1, wherein
   if the positive longitudinal acceleration process has occurred or begun within the first predetermined time window, the switch is made from manual mode back to the automatic mode after the positive longitudinal acceleration process has ended.

3. The device according to claim 1, wherein
   if the positive longitudinal acceleration process has occurred or begun within the first predetermined time window, the switch is made from the manual mode back to the automatic mode when the positive longitudinal acceleration process has ended and no new longitudinal acceleration process has begun within a second predetermined time window.

4. The device according to claim 2, wherein
   if the positive longitudinal acceleration process has occurred or begun within the first predetermined time window, the switch is made from the manual mode back to the automatic mode when the positive longitudinal acceleration process has ended and no new longitudinal acceleration process has begun within a second predetermined time window.

5. The device according to claim 1, wherein
   the switch from the manual mode is made back to the automatic mode occurs when no positive longitudinal acceleration process has begun within a second predetermined time window.

6. The device according to claim 1, wherein
   if the second selection device is reactuated within a predetermined time window or during the positive longitudinal acceleration process, a further gear shift is performed and the verification process is restarted.

7. The device according to claim 1, wherein
   at least one of the first selection device and a control element are arranged to require actuation before the second selection device is actuated in order to provide consistent switching to the manual mode.

* * * * *